(12) United States Patent
Xu et al.

(10) Patent No.: US 12,038,071 B2
(45) Date of Patent: Jul. 16, 2024

(54) ELECTRIC ACTUATOR HAVING HAND-SCREW RELEASE DEVICE

(71) Applicant: ZHEJIANG JIECANG LINEAR MOTION TECHNOLOGY CO., LTD., Zhejiang (CN)

(72) Inventors: Xin Xu, Shaoxing (CN); Xinxing Zhao, Shaoxing (CN)

(73) Assignee: ZHEJIANG JIECANG LINEAR MOTION TECHNOLOGY CO., LTD., Shaoxing (CN)

( * ) Notice: Subject to any disclaimer, the term of this patent is extended or adjusted under 35 U.S.C. 154(b) by 151 days.

(21) Appl. No.: 17/919,581

(22) PCT Filed: Aug. 13, 2021

(86) PCT No.: PCT/CN2021/112502
§ 371 (c)(1),
(2) Date: Oct. 18, 2022

(87) PCT Pub. No.: WO2022/037494
PCT Pub. Date: Feb. 24, 2022

(65) Prior Publication Data
US 2023/0151880 A1    May 18, 2023

(30) Foreign Application Priority Data

Aug. 20, 2020   (CN) ......................... 202010841547.X

(51) Int. Cl.
*F16H 25/24*     (2006.01)
*H02K 7/06*      (2006.01)
(Continued)

(52) U.S. Cl.
CPC ........... *F16H 25/2454* (2013.01); *H02K 7/06* (2013.01); *H02K 7/108* (2013.01); *H02K 7/1166* (2013.01);
(Continued)

(58) Field of Classification Search
CPC ..... F16H 2025/2065; F16H 2025/2071; F16H 2025/209; F16H 2025/2463; F16H 25/2454
See application file for complete search history.

(56) References Cited

U.S. PATENT DOCUMENTS 5,575,790 A     11/1996  Chen et al.
6,158,295 A  *  12/2000  Nielsen ............... F16H 25/2454
                                               192/223.4
(Continued)

FOREIGN PATENT DOCUMENTS

CN     101106297 A     1/2008
CN     202812033 U     3/2013
(Continued)

OTHER PUBLICATIONS

Sep. 28, 2021 International Search Report issued in International Patent Application No. PCT/CN2021/112502.
(Continued)

*Primary Examiner* — Charles A Fox
*Assistant Examiner* — Gregory T Prather
(74) *Attorney, Agent, or Firm* — Oliff PLC

(57) ABSTRACT

An electric actuator having a hand-screw release device, including: housing, drive motor, transmission assembly, rotary screw rod and driving nut, and further including: clutch device configured to engage or disengage power transmission between the transmission assembly and the rotary screw rod; a self-locking device configured to produce a friction resistance against the rotary screw rod when the rotary screw rod rotates reversely; and a hand-screw release device including a release rotary knob, the first driving member being connected to the clutch device, the second driving member being configured to connect the self-locking device, and the release rotary knob being turned to present an initial state and a completely released state, (Continued)

wherein in the course of switching from the initial state to the completely released state, the first driving member activates the clutch device to disengage the power connection, and the second driving member activates the release torsion spring to release.

10 Claims, 3 Drawing Sheets

(51) Int. Cl.
    *H02K 7/108*     (2006.01)
    *H02K 7/116*     (2006.01)
    *F16H 25/20*     (2006.01)

(52) U.S. Cl.
    CPC ............... *F16H 2025/2031* (2013.01); *F16H 2025/2065* (2013.01); *F16H 2025/2071* (2013.01); *F16H 2025/2084* (2013.01); *F16H 2025/209* (2013.01); *F16H 2025/2463* (2013.01)

(56) References Cited

U.S. PATENT DOCUMENTS

| | | |
|---|---|---|
| 2014/0260730 A1 | 9/2014 | Wu |
| 2014/0345404 A1 | 11/2014 | Wu |
| 2022/0412441 A1* | 12/2022 | Xu .................. H02K 7/06 |

FOREIGN PATENT DOCUMENTS

| | | |
|---|---|---|
| CN | 105634192 A | 6/2016 |
| CN | 206054568 U | 3/2017 |
| CN | 110089011 A | 8/2019 |
| CN | 111577850 A | 8/2020 |
| CN | 111810603 A | 10/2020 |
| CN | 112096819 A | 12/2020 |
| DE | 10 2013 108 031 A1 | 11/2014 |
| EP | 1 637 775 A1 | 3/2006 |
| WO | 98/30816 A1 | 7/1998 |

OTHER PUBLICATIONS

Feb. 16, 2023 International Preliminary Report on Patentability issued in International Patent Application No. PCT/CN2021/112502.

Sep. 14, 2023 Extended Search Report issued in European Patent Application No. 21857589.2.

* cited by examiner

ELECTRIC ACTUATOR HAVING HAND-SCREW RELEASE DEVICE

FIELD

The disclosure belongs to the technical field of linear actuation technologies, and more particularly relates to an electric actuator having a hand-screw release device.

BACKGROUND

An electric actuator, also referred to as a linear actuator, is widely used in fields such as furniture, medical equipment, and solar power generation. The electric actuator mainly comprises: a drive motor, a drive worm, a worm gear, a screw rod, and a nut. The operating principle of electric actuators goes like this: the drive motor activates the drive worm to rotate; the drive worm which meshes with the worm gear actuates the worm gear to rotate; then rotation of the worm gear drives the screw rod to rotate, and rotation of the screw rod drives the nut to move axially; since the nut is usually attached to an inner tube, the axial movement of the nut results in extension and retraction motion of the inner tube.

Owing to application environments of the electric actuator, a clutch device is additionally provided mainly to disengage power transmission between the drive motor and the rotary screw rod when the electric actuator encounters drive motor failure or power-off or other circumstances which require power cutoff, whereby the rotary screw rod may be manually activated to realize reverse push. For example, the Chinese Patent Application No. CN201621013870.3 discloses a solution of additionally providing a clutch device to an electric actuator.

In addition, in order to generate a resistance upon retraction of the electric actuator, a self-locking device is usually provided on the electric actuator; the self-locking device generally comprises a friction sleeve and a self-locking torsion spring sleeved outside the friction sleeve, such that when the friction sleeve rotates reversely along with the rotary screw rod, the self-locking torsion spring retracts radially to embrace the friction sleeve, whereby to generate a self-locking resistance against the rotary screw rod. Such self-locking devices provided on an electric actuator have been well known.

However, conventional electric actuators are only provided with either a clutch device or a self-locking device; even the clutch device and the self-locking device are both provided, the driving units for driving the two devices are usually provided standalone, such that in the case of need to control the clutch device and the self-locking device simultaneously, it would be very complex to manipulate the two devices independently and synchronously.

Moreover, conventional clutch devices or self-locking devices are substantially driven by a cable pulling a cable pulling lever; however, it is difficult to control the pulling strength or stroke of such a driving manner, resulting in operation clumsiness of the clutch device or self-locking device. Hand-screw release devices are already available in the market. For example, the Chinese Utility Patent No. CN201220326831.4 discloses a hand-screw release solution. However, such a hand-screw device is usually mounted on an end portion of the electric actuator, and if the installed stroke of the electric actuator is restricted, the mount space for the electric actuator with a hand-screw device would be affected.

SUMMARY

To overcome the above and other drawbacks in conventional technologies, the disclosure provides an electric actuator having a hand-screw release device, which enables control of two devices with one hand-screw release device and offers smoother, more convenient operation.

The present disclosure adopts the following technical solution.

An electric actuator having a hand-screw release device comprises: a housing, a drive motor, a transmission assembly, a rotary screw rod and a driving nut, the drive motor activating, via the transmission assembly, the rotary screw rod to rotate, rotation of the rotary screw rod driving the driving nut to move axially along the rotary screw rod; and the electric actuator further comprises:

a clutch device provided between the transmission assembly and the rotary screw rod, configured to engage or disengage power transmission between the transmission assembly and the rotary screw rod;

a self-locking device configured to produce a friction resistance against the rotary screw rod when the rotary screw rod rotates reversely, wherein the self-locking device comprises a release torsion spring for unlocking the self-locking device; and a hand-screw release device provided on the housing, the hand-screw release device comprising a first driving member, a second driving member, and a release rotary knob for activating the first driving member and the second driving member, the first driving member being connected to the clutch device, the second driving member being configured to connect the self-locking device, and the release rotary knob being turned to present an initial state and a completely released state, wherein in the course of switching from the initial state to the completely released state, the first driving member activates the clutch device to disengage power connection, and the second driving member activates the release torsion spring to release.

The present disclosure offers the following benefits:

The electric actuator according to the present disclosure is provided with both a clutch device and a self-locking device, which improves functional versatility of the electric actuator; moreover, the clutch device in combination with the self-locking device further offers an advantage that the rotary screw rod, which is substantially in a completely free rotation state after the clutch device disengages the power transmission, easily results in a very fast retraction speed of the electric actuator, while the self-locking device may provide certain resistance to prevent the rotary screw rod from retracting too fast.

Secondly, the self-locking device according to the disclosure is further provided with a release torsion spring, such that the self-locking device is unlockable by itself; when the release torsion spring is released, the self-locking device is in an unlocked state; now, irrespective of whether the electric actuator rotates forwardly or reversely, the self-locking device substantially produces no resistance against the rotary screw rod, which renders the electric actuator in a state of quick release, i.e., the electric actuator may retract quickly.

Additionally, the electric actuator according to the disclosure is further provided with a hand-screw release device in this embodiment. The hand-screw release device comprises a first driving member, a second driving member, and a release rotary knob configured to activate the first driving member and the second driving member, the first driving member and the second driving member being configured to drive the clutch device and the self-locking device, respectively, such that when it is needed to quickly release the electric actuator, an operator manipulates the hand-screw release device to be in a completely released state, which renders the clutch device in a disengaged state and meanwhile the self-locking device in an unlocked state; accordingly, the user may conveniently control the two devices by manipulating the hand-screw release device.

Finally, the hand-screw release device according to the present disclosure is released via the release rotary knob. Such rotational setting enables better control of the driving strokes of the first driving member and the second driving member, thereby mitigating the instantaneous over large driving stroke occurring to the first driving member and second driving member as much as possible, and thereby offering a smoother operation. Moreover, the hand-screw release device according to the present disclosure is disposed on the housing, rather than being disposed on an end portion of the electric actuator like a conventional hand-screw device, which eliminates a need of additionally increasing the axial retracted height of the electric actuator, without affecting the axial mount space.

Preferably, the hand-screw release device further comprises a pull lever axially movable along the rotary screw rod, a rack portion being provided on the pull lever, the release rotary knob being attached with a release gear which meshes with the rack portion.

Preferably, the electric actuator comprises an outer tube, and an inner tube extendable and retractable relative to the outer tube, a mount base being mounted on the outer tube, the release rotary knob being rotatably mounted on the mount base, the pull lever being at least partially slidably mounted on the mount base.

Preferably, a limit step is provided on the pull lever, a pull lever reset spring for resetting the pull lever is provided between the limit step and the mount base.

Preferably, the second driving member comprises a push block, the push block being provided on the pull lever or being provided integrated with the pull lever, the push block having a guiding face, the release torsion spring comprising a pin which extends radially, wherein when the pull lever moves axially, the guiding face on the push block abuts against the pin, resulting in outward expanding of the release torsion spring.

Preferably, the first driving member comprises a swing link rotatable relative to the housing, wherein axial movement of the pull lever brings the swing link to rotate, and swinging of the swing link axially pushes the clutch device.

Preferably, the transmission assembly comprises a drive worm and a drive worm gear, the drive worm being connected to the drive motor, the drive worm gear being sleeved outside the rotary screw rod, the clutch device being provided between the drive worm gear and the rotary screw rod.

Preferably, the clutch device comprises an adapter coupling, a toothed groove in transmission fit with the adapter coupling being provided on the drive worm gear, the adapter coupling being sleeved over the rotary screw rod and axially movable relative to the rotary screw rod.

Preferably, the self-locking device comprises a first friction sleeve and a second friction sleeve; the first friction sleeve and the second friction sleeve being sleeved over the rotary screw rod, respectively, an axial end face of the first friction sleeve abutting against an axial end face of the second friction sleeve, the first friction sleeve rotating synchronously with the rotary screw rod, the second friction sleeve rotating freely relative to the rotary screw rod, a self-locking torsion spring being sleeved over the first friction sleeve, and the release torsion spring being sleeved over the second friction sleeve; or, the self-locking device comprises a third friction sleeve, the third friction sleeve rotating synchronously with the rotary screw rod, the release torsion spring being sleeved over the third friction sleeve.

Preferably, in the course of the hand-screw release device's returning to the initial state from the completely released state, the second driving member is firstly disengaged from the release torsion spring on the self-locking device to generate a self-locking force, and after the release torsion spring returns to the initial state, the first driving member is correspondingly disengaged from the clutch device.

These characteristics and advantages of the disclosure will be disclosed in detail through the embodiments below with reference to the accompanying drawings.

BRIEF DESCRIPTION OF THE DRAWINGS

Hereinafter, the disclosure will be described in further detail with reference to the accompanying drawings, among which.

DETAILED DESCRIPTION

Figure 1:
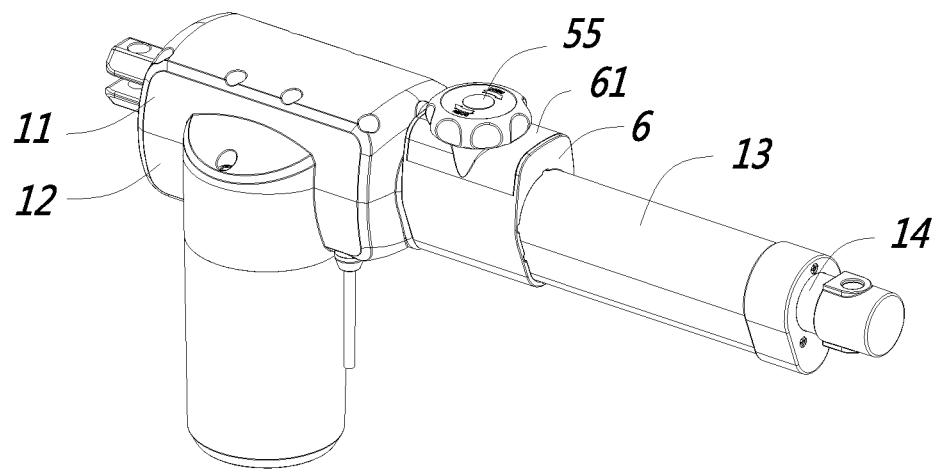
FIG. 1 is a first overall schematic view of an electric actuator according to a first embodiment of the disclosure.

Hereinafter, the technical solutions of the present disclosure will be explained and illustrated through embodiments with reference to the accompanying drawings. However, the embodiments are only some embodiments of the present disclosure, not all of them. Other embodiments obtained by those skilled in the art without exercise of inventive work based on the examples in the embodiments all fall within the protection scope of the present disclosure.

In the description of the present disclosure, it should be understood that the orientational or positional relationships indicated by the terms "inner," "outer," "upper," "lower," "left," and "right," etc. are orientational or positional relationships based on the drawings, which are intended merely for facilitating description of the present disclosure and simplifying; relevant illustrations, not for indicating or implying that the devices or elements compulsorily possess those specific orientations and are compulsorily configured and operated with those specific orientations; therefore, such terms should not be construed as limitations to the present disclosure.

First Embodiment

As illustrated in FIGS. 1 to 5, an electric actuator, also referred to as a linear actuator, is provided in this embodiment. The electric actuator comprises: a housing, an outer tube 13, an inner tube 14, a drive motor, a transmission assembly, a rotary screw rod 20, and a driving nut 21, wherein the drive motor activates, via the transmission assembly, the rotary screw rod 20 to rotate, and rotation of the rotary screw rod 20 brings the driving nut 21 to move axially along the rotary screw rod 20; since the driving nut 21 is securely connected to the inner tube 14, axial movement of the driving nut 21 brings the inner tube 14 to move axially relative to the outer tube 13 and the housing; a to-be-driven object is connected to an outer end of the inner tube 14. The electric actuator in this embodiment further comprises:

a clutch device provided between the transmission assembly and the rotary screw rod 20, and configured to engage or disengage power transmission between the transmission assembly and the rotary screw rod 20;

a self-locking device configured to generate a friction resistance against the rotary screw rod 20 when the rotary screw rod 20 rotates reversely, wherein the self-locking device comprises a release torsion spring 43 for unlocking the self-locking device; and a hand-screw release device provided on the housing, the housing comprising an upper housing 11 and a lower housing 12 in this embodiment; wherein the hand-screw release device comprises a first driving member, a second driving member, and a release rotary knob 55 configured to activate the first driving member and the second driving member, the first driving member being connected to the clutch device, the second driving member being configured to connect the self-locking device, the release rotary knob being turned to present an initial state and a completely released state, wherein in the course of switching from the initial state to the completely released state, the first driving member drives the clutch device to disengage power connection, and the second driving member activates the release torsion spring to release.

In this embodiment, the electric actuator is provided with both a clutch device and a self-locking device, which improves functional versatility of the electric actuator; moreover, the clutch device in combination with the self-locking device further offers an advantage that the rotary screw rod 20, which is substantially in a completely free rotation state after the clutch device disengages the power transmission, easily results in a very fast retraction speed of the electric actuator, while the self-locking device may provide certain resistance to prevent the rotary screw rod 20 from rotating too fast, thereby preventing the driving unit 21 from retracting too fast.

Secondly, the self-locking device is further provided with a release torsion spring 43, such that the self-locking device is unlockable by itself; when the release torsion spring is released, the self-locking device is in an unlocked state; now, irrespective of whether the electric actuator rotates forwardly or reversely, the self-locking device substantially produces no resistance against the rotary screw rod 20, which renders the electric actuator in a state of quick release, i.e., the electric actuator may retract quickly.

Additionally, the electric actuator is further provided with a hand-screw release device in this embodiment. The hand-screw release device comprises a first driving member, a second driving member, and a release rotary knob 55 configured to activate the first driving member and the second driving member, the first driving member and the second driving member being configured to activate the clutch device and the self-locking device, respectively, such that when it is needed to quickly release the electric actuator, an operator manipulates the hand-screw release device to be in a completely released state, which renders the clutch device in a disengaged state and meanwhile the self-locking device in an unlocked state; accordingly, the user may conveniently control the two devices by manipulating the one hand-screw release device.

Finally, the hand-screw release device in the present disclosure is released via a release rotary knob 55. Such rotational setting enables better control of the driving strokes of the first driving member and the second driving member, mitigating the instantaneous over large driving stroke occurring to the first driving member and second driving member as much as possible, thereby offering a smoother operation. Moreover, the hand-screw release device according to the present disclosure is disposed on the housing, rather than being disposed on an end portion of the electric actuator like a conventional hand-screw device, which eliminates a need of additionally increasing the axial retracted height of the electric actuator, without affecting the axial mount space.

In this embodiment, in order to improve manipulation precision of the release rotary knob 55 when being turned, the hand-screw release device further comprises a pull lever 51 which is axially movable along the rotary screw rod, a rack portion 511 being provided on the pull lever, wherein the rack portion 511 may be constructed integrally with or separately from the pull lever 51; the release rotary knob 55 is attached with a release gear 551 in mesh with the rack portion 511, such that when the release rotary knob 55 is rotated, the release gear 551 is brought to rotate, while rotation of the release gear 551 drives the rack portion 511 to move axially along the rotary screw rod 20, thereby driving the pull lever 51 to move axially; axial movement of the pull lever 51 brings the first driving member and the second driving member to move, thereby achieving the purpose of driving the clutch device and the self-locking device.

Figure 2:
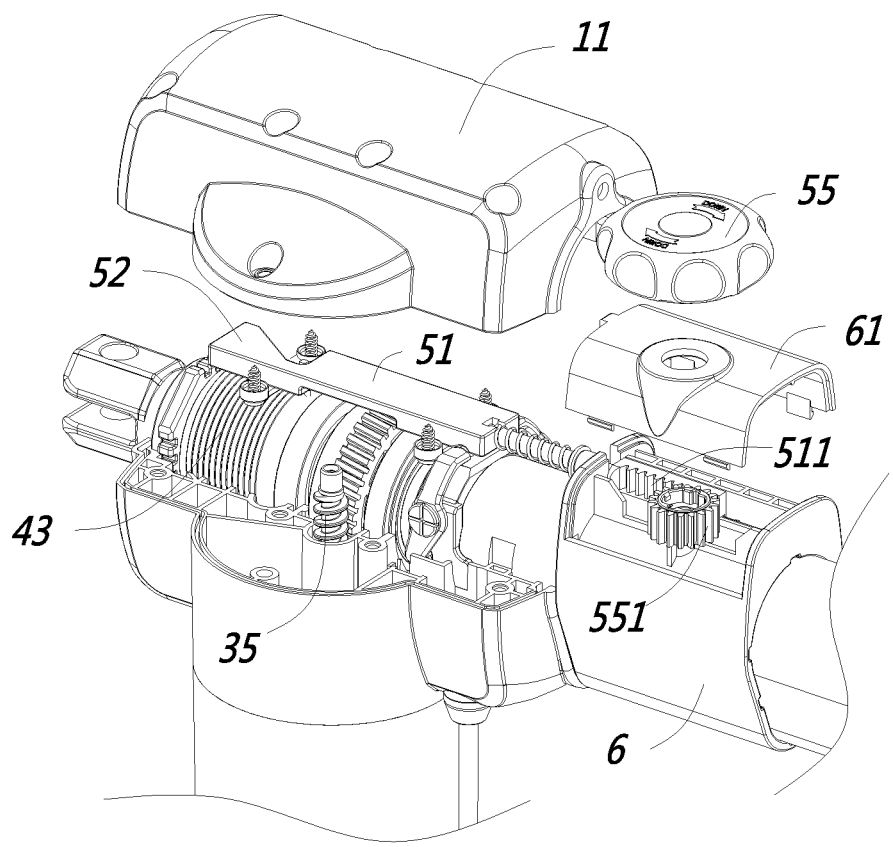
FIG. 2 is a first exploded schematic view of the electric actuator according to the first embodiment of the disclosure.

In order to install the pull lever 51 more securely, a mount base 6 is mounted on the outer tube in this embodiment, the release rotary knob 55 is rotatably mounted on the mount base 6, and the pull lever 51 is at least partially slidably mounted on the mount base 6. As illustrated in FIGS. 1 and 2, the mount base 6 is sleeved over the outer tube 13 in this example, the rack portion 511 of the pull lever 51 being disposed in the mount base 6, a fraction of the pull lever 51 extending out of the mount base 6; a base cover plate 61 is provided over the mount base 6 to cover those parts including the release gear 551 and the rack portion 511.

A limit step is provided on the pull lever in this embodiment, a pull lever resetting spring 56 for resetting the pull lever 51 being provided between the limit step and the mount base 6. In this embodiment, the pull lever comprises a first pull lever and a second pull lever, the first pull lever being configured mainly to drive the first driving member and the second driving member, the corresponding rack portion 511 being provided on the second pull lever, wherein the first pull lever has a rectangular flat shape as a whole and the second pull lever is relative thin cable, thereby forming the limit step at a joint between the first pull lever and the second pull lever; while the pull lever reset spring 56 is disposed between the limit step and the mount base 6, such that when the force applied upon the release rotary knob vanishes, the corresponding pull lever is reset to the initial position under the action of the pull lever reset spring 56.

In this embodiment, the transmission assembly comprises a drive worm 35 and a drive worm gear 34, wherein the drive worm 35 is connected to the drive motor, the drive worm gear 34 is sleeved outside the rotary screw rod 20 and coaxial with the rotary screw rod 20, and the clutch device is disposed between the drive worm gear 34 and the rotary screw rod 20. In this embodiment, the clutch device is mainly configured to disengage the power link between the drive worm gear 34 and the rotary screw rod 20.

Figure 4:
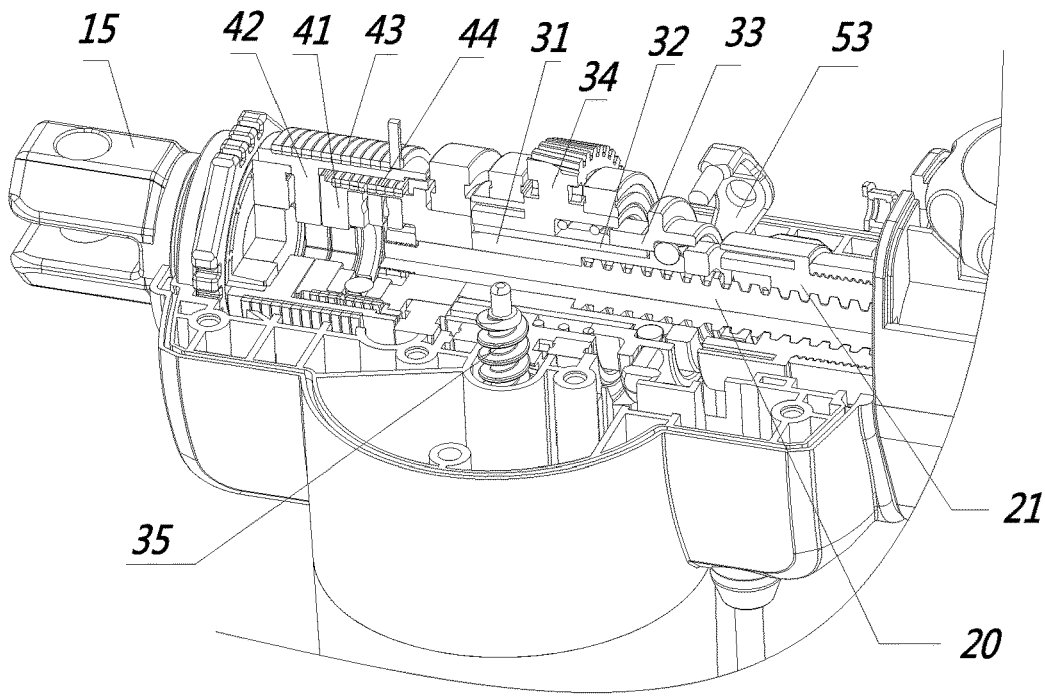
FIG. 4 is a local enlarged schematic view of the electric actuator according to the first embodiment of the disclosure.
Figure 5:
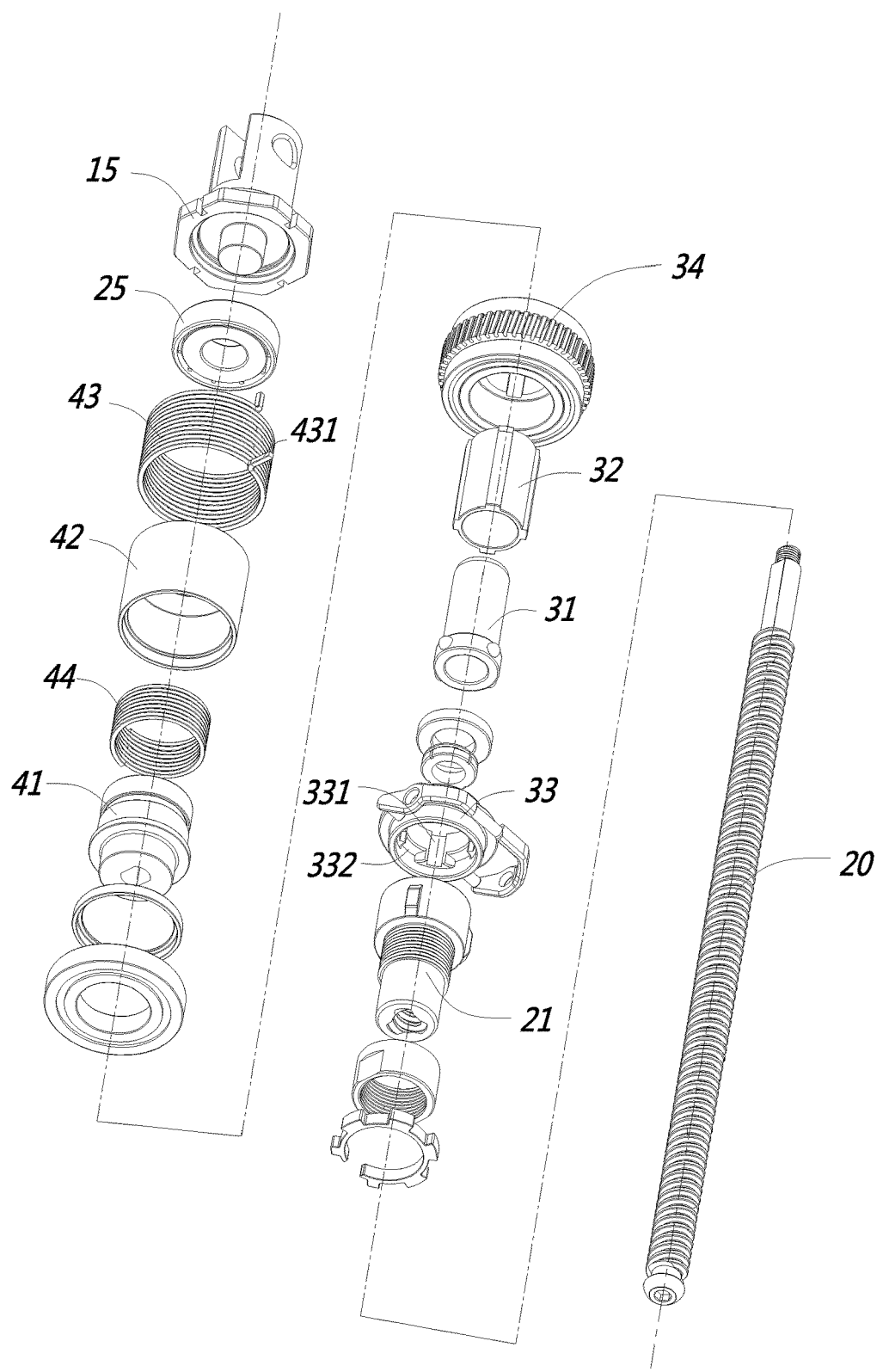
FIG. 5 is an exploded schematic view of internal parts in the electric actuator according to the first embodiment of the disclosure.

Hereinafter, specific constructions of the clutch device and the self-locking device are described below:

FIGS. 4 and 5 illustrate a specific construction of the clutch device in this embodiment. The clutch device comprises a ball bushing 31, a spline sleeve 32, and an adapter coupling 33, wherein the ball bushing 31 is sleeved over the rotary screw rod 20 via a squared section and rotates synchronously with the rotary screw rod 20; a plurality of balls are provided on an outer periphery of one end of the ball bushing 31, the spline sleeve 32 is sleeved outside the ball bushing 31, and the spline sleeve 32 is constantly in mesh with the drive worm gear 34, wherein the spline sleeve 32 and the ball set 31 are not directly connected, and the adapter coupling 33 is configured to engage or disengage the spline sleeve 32 with or from the ball bushing 31, the adapter coupling 33 being axially movable relative to the rotary screw rod 20.

As illustrated in FIG. 5, a spline slot fitted with the spline sleeve 32 is provided on an inner wall of the adapter coupling 33 in this embodiment, i.e., the adapter coupling 33 constantly rotates synchronously with the spline sleeve 32; a ball groove 332 fitted with balls of the ball bushing 31 is further provided on an inner wall of the adapter coupling 33, such that when the adapter coupling 33 moves axially towards the balls on the ball bushing 31, the balls are docked into the ball groove 332, causing the adapter coupling 33 to be fitted and docked with the ball groove 332, thereby implementing torque transmission between the adapter coupling 33 and the ball bushing 31. Therefore, the adapter coupling now serves to couple the rotary screw rod 20 and the drive worm gear 34. The state illustrated in FIG. 4 is the state in which the adapter coupling 33 is docked with the ball bushing 31. When the adapter coupling 33 moves away from the balls, the adapter coupling 33 is disengaged from the ball bushing 31, whereby to disengage torque transmission between the adapter coupling 33 and the rotary screw rod 20.

In this embodiment, the self-locking device comprises: a first friction sleeve 41, a second friction sleeve 42, a release torque spring 43, and a self-locking torque spring 44, wherein the second friction sleeve 42 is sleeved outside the first friction sleeve 41, an outer end face of the first friction sleeve 41 abuts against an inner end face of the second friction sleeve 42, and the first friction sleeve 41 and the rotary screw rod 20 are positioned via a squared section, i.e., in the circumferential direction, the first friction sleeve 41 and the rotary screw rod 20 rotate synchronously therebetween, while the second friction sleeve 42 rotates freely relative to the rotary screw rod 20; and in the axial direction, the outer end face of the first friction sleeve 41 abuts against the inner end face of the second friction sleeve 42. Meanwhile, the release torque spring 43 is sleeved over the second friction sleeve 42, the release torque spring 43 always embraces the second friction sleeve 42 in the initial state, and the self-locking torque spring 44 is sleeved over the first friction sleeve 41. The self-locking device in this embodiment reduces the mount space, mainly the axial space, which facilitates reducing the overall size of the electric actuator.

When the inner tube 14 in the electric actuator extends out normally, the drive motor activates, via the clutch device, the rotary screw rod 20 to rotate forwardly; and after the inner tube 14 extends out till a predetermined position, the drive motor stops. At that position, when the inner tube 14 has a retraction tendency, an axial end face of the first friction sleeve 41 abuts against an axial end face of the second friction sleeve 42; since the self-locking torque spring 44 serves to embrace the first friction sleeve 41 to produce a resistance and meanwhile the second friction sleeve 42 is also embraced by the release torque spring 43 in a normal state, a friction resistance is produced when the end face of the first friction sleeve 41 abuts against the end face of the second friction sleeve 42; the friction resistance generates a resistance against the rotary screw rod 20 to prevent the rotary screw rod 20 from reverse rotation, thereby implementing self-locking.

In the case of normal retraction of the electric actuator, the drive motor drives, via the clutch device, the rotary screw rod 20 to rotate reversely; at this point, the rotating torque of the rotary screw rod 20 overcomes the self-locking force provided by the self-locking device, and the rotary screw rod 20 continues reverse rotation.

When the electric actuator needs to retract rapidly before extending out to the predetermined position, this embodiment enables unlocking of the self-locking device, thereby achieving the purpose of rapid release. In this embodiment, the unlocking is mainly implemented via the second driving member. The second driving member specifically comprises: a push block 52, the push block 52 being preferably integrated with the pull lever, i.e., in this embodiment, the self-locking device and the clutch device share one pull lever 51; the push block 52 is provided with a guiding face 521; the release torque spring 43 comprises a pin 431 extending radially; wherein the guiding face 521 is disposed on a side face of the push block 52, such that when the pull lever 51 is pulled to move, the guiding face 521 on the push block 52 abuts against the pin 431 to outwardly expand the release torque spring 43; when the release torque spring 43 is expanded outwardly, the resistance between the release torque spring 43 and the second friction sleeve 42 will be diminished correspondingly. In this state, when the end face of the first friction sleeve 41 abuts against the end face of the second friction sleeve 42, the second friction sleeve 42 will rotate synchronously along with the first friction sleeve 41; as such, the first friction sleeve 41 does not produce a resistance against the rotary screw rod 20, thereby achieving a resistance-free state of the rotary screw rod 20. At this point, if the clutch device disengages the connection, the self-locking device will also be unlocked. Under this state, the rotary screw rod 20 is substantially in a freely idling state, which enables rapid retraction of the driving nut 21.

Additionally, in this embodiment, by gradually pushing the release torque spring 43 via the guiding face 521, the self-locking device is gradually diminished, such that the self-locking device will not vanish abruptly, thereby achieving an objective of stepless adjustment.

In view that the clutch device and the self-locking device are both provided in this embodiment, the axial force is transmitted in the following manner:

When the inner tube 14 of the electric actuator extends till a predetermined position and has a tendency of retraction, the axial force of the inner tube 14 is transmitted to the driving nut 21; the driving nut 21 transmits the axial force to the rotary screw rod 20; when the rotary screw rod 20 is subjected to the axial force, the ball bushing 31 abuts against the shoulder position of the rotary screw rod 20, such that the axial force applied against the rotary screw rod 20 is first transmitted to the ball bushing 31; since the end face of the ball bushing 31 abuts against the end face of the first friction sleeve 41, i.e., the ball bushing 31 and the first friction sleeve 41 are axially limited, the axial force is transmitted to the first friction sleeve 41; since the tail end face of the first friction sleeve 41 abuts against the inner end face of the second friction sleeve 42, the axial force is transmitted to the second friction sleeve 42; and since a conical roller bearing 25 is provided between the tail end face and the tail pull head 15 of the second friction sleeve 42, the axial force will be finally transmitted to the tail pull head 15 via the conical roller bearing 25.

In this embodiment, the ball bushing 31, the first friction sleeve 41, and the second friction sleeve 42 jointly constitute an axial limit kit, wherein the rotary screw rod 20 transmits the axial force to the tail pull head 15 via the axial limit kit; from the perspective of the overall process of axial force transmission, the adapter coupling 33 in this embodiment is never subjected to the action of the axial force; therefore, it is also labor-saving to turn the adaptor coupling 33.

Meanwhile, since the clutch device is not subjected to the axial force from the rotary screw rod 20, the service life of the clutch device may be significantly improved. Of course, it is noted that, if the self-locking device is not provided in the electric actuator, a shaft sleeve-like construction may be additionally provided to the rotary screw rod 20, serving as an axial limit kit.

In this embodiment, the first friction sleeve 41 preferably comprises a front sleeve and a rear sleeve, and a thrust bearing is provided to abut against the axial middle between the front sleeve and the rear sleeve; in an alternative embodiment, the first friction sleeve 41 may be an integral sleeve.

In this embodiment, the first driving member comprises: a swing link 53 connected to the pull lever 51. In an actual installation, an upper end of the swing link 53 is rotatably connected to the pull lever 51. Specifically, a notch is provided at the bottom of the pull lever 51, the top of the swing link 53 is positioned in the notch; the middle of the swing link 53 is rotatably mounted on a swing link sleeve 531; a lower end of the swing link 53 is connected to the adapter coupling 33, such that when the pull lever 51 is pulled to move, the swing link 53 swings to push the adapter coupling 33 to move axially.

Figure 3:
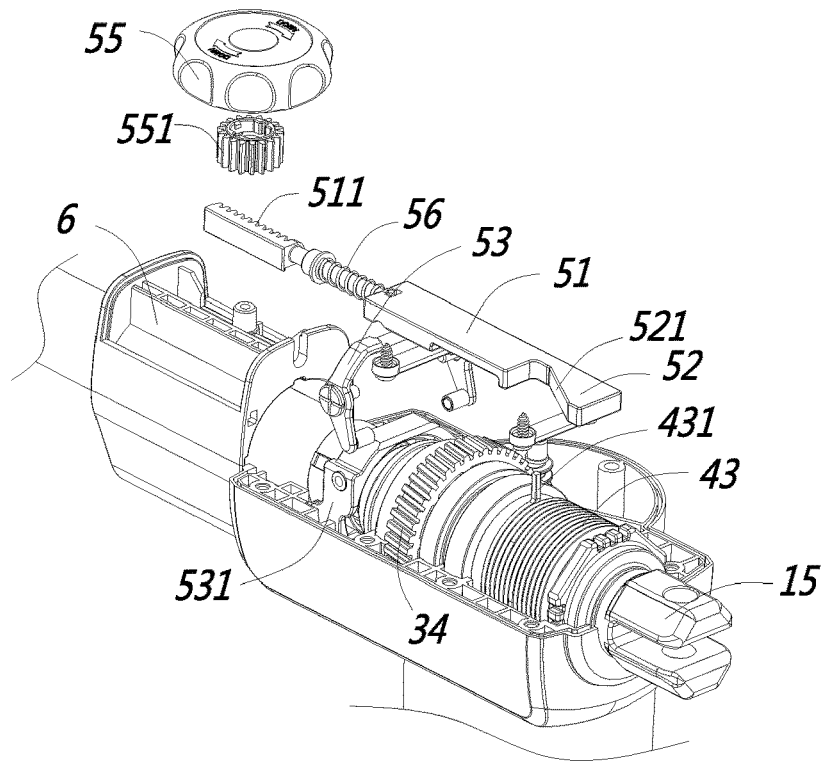
FIG. 3 is second exploded schematic view of the electric actuator according to the first embodiment of the disclosure.

In order to optimize manipulation of the clutch device and the self-locking device, the operation sequence of the clutch device and the self-locking device is optimized in this embodiment:

As illustrated in FIG. 2 and FIG. 3, in the initial state, the guiding face 521 of the push block 52 needs to move a segment of stroke to be in contact with the pin 431 of the release torque spring 43; this segment of stroke may be understood as an idle stroke of the push block 52; during this idle stroke, the clutch device operates normally, such that the adapter coupling 33 is first turned; meanwhile, upon reset, the self-locking device is first self-locked, and then the clutch device performs power engagement, offering an advantage that after the self-locking device produces a self-locking force, the rotating speed of the rotary screw rod 20 decreases, such that when the adapter coupling 33 is engaged with the ball bushing 31, no damages are caused to the adapter coupling 33 and the ball bushing 31, thereby significantly extending their service life.

It is noted that the constructions of the self-locking device and the clutch device are not limited to those illustrated in this embodiment. An exemplary self-locking device may merely comprise one third friction sleeve, wherein the third friction sleeve rotates synchronously with the rotary screw rod 20, and the release torque spring 43 is sleeved over the third friction sleeve; in the initial state, the release torque spring 43 embraces the third friction sleeve to produce a resistance against the rotary screw rod 20; in this case, the release torque spring 43 serves as the self-locking torque spring 44; after the release torque spring 43 is pushed to move by the push block 52, the resistance from the release torque spring 43 against the third friction sleeve vanishes. An exemplary clutch device may be implemented by an alternative combination of the spline sleeve 32 and the spline.

What have been described above are merely embodiments of the present disclosure; however, the protection scope of the present disclosure is not limited thereto. A person skilled in the art should understand that the disclosure includes, but is not limited to, the contents described in the drawings and the embodiments. Any modifications without departing from the functions and structural principles of the disclosure will be included within the scope of the claims.

We claim:

1. An electric actuator having a hand-screw release device, the electric actuator comprising: a housing, a drive motor, a transmission assembly, a rotary screw rod and a driving nut, the drive motor activating, via the transmission assembly, the rotary screw rod to rotate, rotation of the rotary screw rod bringing the driving nut to move axially along the rotary screw rod, characterized in that the electric actuator further comprises:
   a clutch device provided between the transmission assembly and the rotary screw rod and configured to engage or disengage power transmission between the transmission assembly and the rotary screw rod;
   a self-locking device configured to produce a friction resistance against the rotary screw rod when the rotary screw rod rotates reversely, wherein the self-locking device comprises a release torsion spring for unlocking the self-locking device; and
   a hand-screw release device provided on the housing, the hand-screw release device comprising a first driving member, a second driving member, and a release rotary knob for activating the first driving member and the second driving member, the first driving member being connected to the clutch device, the second driving member being configured to connect the self-locking device, and the release rotary knob being turned to present an initial state and a completely released state, wherein in the course of switching from the initial state to the completely released state, the first driving member activates the clutch device to disengage the power connection, and the second driving member activates the release torsion spring to unlock the self-locking device.

2. The electric actuator having a hand-screw release device according to claim 1, characterized in that the hand-screw release device further comprises a pull lever axially movable along the rotary screw rod, a rack portion being provided on the pull lever, the release rotary knob being attached with a release gear which meshes with the rack portion.

3. The electric actuator having a hand-screw release device according to claim 2, characterized in that the electric actuator comprises an outer tube and an inner tube extendable and retractable relative to the outer tube, a mount base being mounted on the outer tube, the release rotary knob being rotatably mounted on the mount base, the pull lever being at least partially slidably mounted on the mount base.

4. The electric actuator having a hand-screw release device according to claim 3, characterized in that a limit step is provided on the pull lever, a pull lever reset spring for resetting the pull lever is provided between the limit step and the mount base.

5. The electric actuator having a hand-screw release device according to claim 2, characterized in that the second driving member comprises a push block, the push block being provided on the pull lever or integrated with the pull lever, the push block having a guiding face, the release torsion spring comprising a pin extending radially, wherein when the pull lever moves axially, the guiding face on the push block abuts against the pin, resulting in outward expanding of the release torsion spring.

6. The electric actuator having a hand-screw release device according to claim 2, characterized in that the first driving member comprises a swing link rotatable relative to the housing, wherein axial movement of the pull lever brings the swing link to rotate, and swinging of the swing link axially pushes the clutch device.

7. The electric actuator having a hand-screw release device according to claim 1, characterized in that the transmission assembly comprises a drive worm and a drive worm gear, the drive worm being connected to the drive motor, the drive worm gear being sleeved outside the rotary screw rod, the clutch device being provided between the drive worm gear and the rotary screw rod.

8. The electric actuator having a hand-screw release device according to claim 7, characterized in that the clutch device comprises an adapter coupling, a toothed groove in transmission fit with the adapter coupling being provided on the drive worm gear, the adapter coupling being sleeved over the rotary screw rod and axially movable relative to the rotary screw rod.

9. The electric actuator having a hand-screw release device according to claim 1, characterized in that the self-locking device comprises a first friction sleeve and a second friction sleeve; the first friction sleeve and the second friction sleeve being sleeved over the rotary screw rod, respectively, an axial end face of the first friction sleeve abutting against an axial end face of the second friction sleeve, the first friction sleeve rotating synchronously with the rotary screw rod, the second friction sleeve rotating freely relative to the rotary screw rod, a self-locking torsion spring being sleeved over the first friction sleeve, and the release torsion spring being sleeved over the second friction sleeve; or, the self-locking device comprises a third friction sleeve, the third friction sleeve rotating synchronously with the rotary screw rod, the release torsion spring being sleeved over the third friction sleeve.

10. The electric actuator having a hand-screw release device according to claim 1, characterized in that in the course of the hand-screw release device's returning to the initial state from the completely released state, the second driving member is first disengaged from the release torsion spring on the self-locking device to produce a self-locking force, and after the release torsion spring returns to an initial state, the first driving member is correspondingly disengaged from the clutch device.

* * * * *